United States Patent

Lykes

[11] 3,742,595
[45] July 3, 1973

[54] METHOD OF MANUFACTURING A SUBMERSIBLE MOTOR

[75] Inventor: Robert E. Lykes, Troy, Ohio

[73] Assignee: A. O. Smith Corporation, Milwaukee, Wis.

[22] Filed: Dec. 21, 1970

[21] Appl. No.: 100,000

[52] U.S. Cl. .............. 29/596, 29/205 R, 310/42, 310/43, 310/87, 310/89
[51] Int. Cl. ............................... H02k 15/00
[58] Field of Search .................. 29/596, 205 R; 310/42, 43, 87, 89, 90

[56] References Cited
UNITED STATES PATENTS

| | | | |
|---|---|---|---|
| 3,571,921 | 3/1971 | Pieper | 29/596 |
| 3,538,598 | 11/1970 | Wightman et al. | 29/596 |
| 3,555,651 | 1/1971 | Latussek et al. | 29/596 X |
| 3,518,471 | 6/1970 | Wightman et al. | 310/90 X |
| 3,135,884 | 6/1964 | Luenberger | 310/87 |
| 3,128,399 | 4/1964 | O'Reilly | 310/87 |

Primary Examiner—Charles W. Lanham
Assistant Examiner—Carl E. Hall
Attorney—Andrus, Sceales, Starke & Sawall

[57] ABSTRACT

A stator unit for an induction motor is encapsulated in a plastic and has an inner tubular lining which is coaxially aligned with the rotor bore through a set of bearings and bearing housing. The stator unit is fixed to a tubular unit frame, which is secured by adhesive in tenon grooves of upper and lower end frames. The upper end frame is secured by screws through holes in the upper bearing housing and end frame. In the method of assembly, the upper bearing is placed on an alignment fixture, which has pins adapted to fit the screw holes in the upper bearing housing and end frame. An arbor is inserted through the rotor bore of the upper bearing housing and through a corresponding bore in the end fixture and the upper end frame is placed over the arbor and fitted to the fixture pins. Then the stator unit is assembled over the arbor and into the tenon grooves of the upper end frame, where adhesive is applied. The lower end frame is similarly located on the other side of the motor, a clamping device is secured over the lower end, and the assembly is cured. The encapsulant is injected and after further curing, rotor and cover assemblies are substituted for the arbor and fixture.

8 Claims, 2 Drawing Figures

PATENTED JUL 3 1973 3,742,595
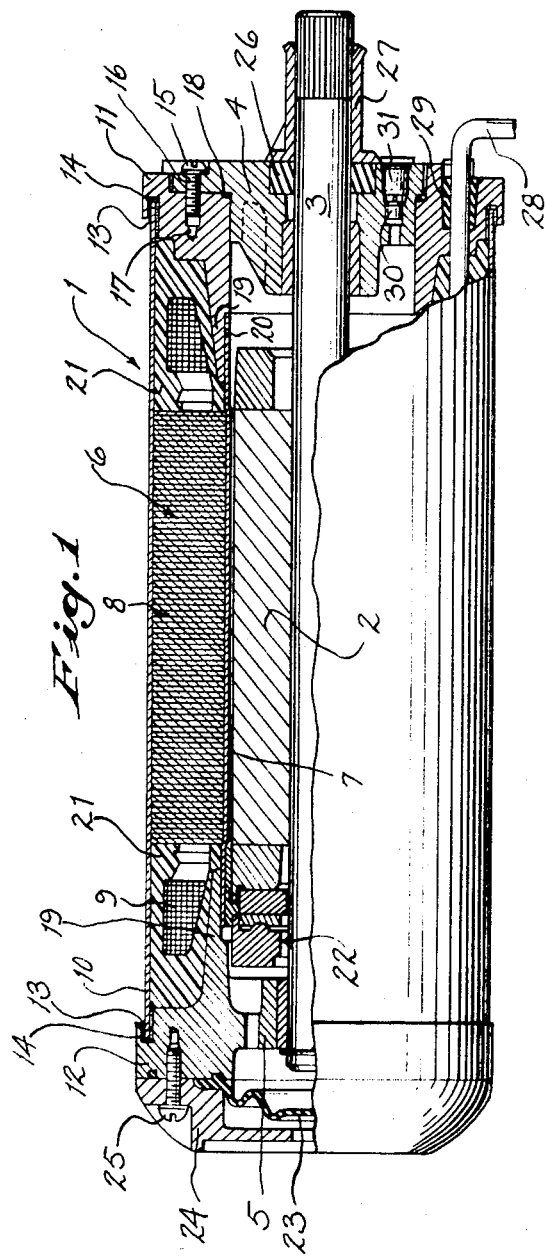
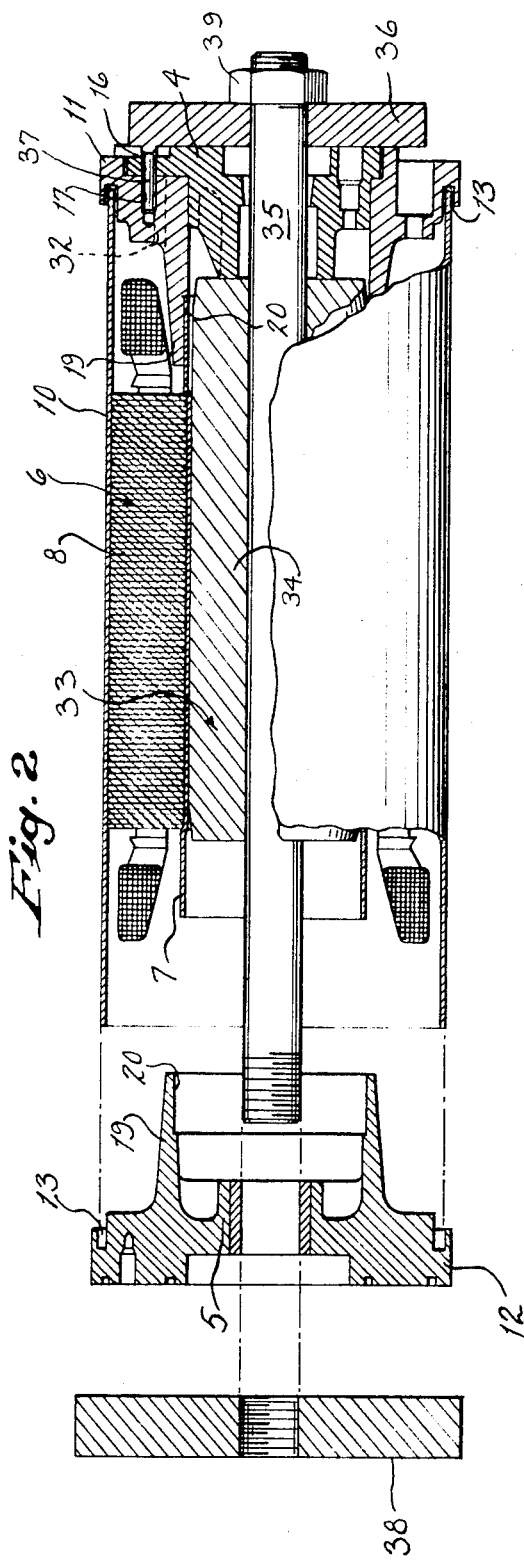
INVENTOR
ROBERT E. LYKES
BY Andrus, Sceales, Starke & Sawall
ATTORNEYS

METHOD OF MANUFACTURING A SUBMERSIBLE MOTOR

BACKGROUND OF THE INVENTION

This invention relates to a method of assembling a dynamoelectric machine using an end alignment fixture in combination with a cylindrical alignment arbor to provide coaxial alignment of the stator and at least one bearing housing.

In submersible motors, the stator core and winding may be enclosed within a hermetically sealed casing to prevent contact between the stator winding and any liquid. This is necessary to prevent short circuiting of the winding. It is conventional to fill the stator enclosure with a thermosetting resin or other suitable filler plastic which sets to a hardened mass. The resin or like filler provides good heat transfer from the winding to dissipate heat therefrom. The rotor generally need not be protected from liquid contact.

The stator casing conventionally includes a tubular lining which is concentric with the rotor bore and the stator housing and which separates the stator unit from the rotor bore and rotor. It is also known to secure the stator unit to the main frame or outer housing and to assemble this subassembly to the end frames.

In assembling a stator and rotor, it is important to obtain accurate coaxial alignment of the stator with the rotor bore. Conventionally, this alignment is provided by precise machining of the end frames, bearing housings or the other parts which define alignment of the rotor bore. These machining processes are costly and time consuming.

Prior inventors such as Bemmann et al in U.S. Pat. No. 3,344,513 have employed arbors or mandrels which corresponded in size and shape to the rotor bores. The stator assembly and various other parts may be aligned on the arbor and apertures in the stator assembly serve as locating fits for the bearing housings. The encapsulant, such as a thermosetting resin, which is provided in the stator winding space, serves to bond the end frames to the stator and main frame sub-assembly. This procedure helps to avoid some of the machining, but still requires a relatively precise fit between the end frame and the main frame.

One inventor, T. G. Meyers in U.S. Pat. No. 3,256,590, achieves alignment of the stator unit and rotor bore by loosely fitting the stator units to the main frame in assembly, thus compensating for any non-alignment between the main frame of the other parts. His structure still requires an accurate fit between the end frames and main frame if the end frames are to be located accurately. Further, the rotor bore aperture in his end frames must be relied on to assure coaxial alignment of the bearing housing. Thus, in this method and apparatus, full assurance of coaxial alignment still requires time consuming machining and assembly procedures.

The primary problem, then, to which the present invention is directed, is to provide accurate coaxial alignment of all the machine parts which define the rotor bore, and to accomplish this in the most simple and convenient manner.

SUMMARY OF THE INVENTION

The practice of the invention provides a dynamoelectric machine with an encapsulated stator unit bonded to end frames with a main frame or housing loosely fitted and adhered to the end frames. This apparatus is advantageously assembled in accordance with the invention to assure coaxial alignment of the stator and the bearing housings to define a precisely shaped rotor bore.

In the method of the invention, an arbor corresponding in diameter to the rotor bore is inserted into an end alignment fixture. An upper end bearing housing is also fitted to the alignment fixture. For this purpose, the fixture has pins disposed to be received into longitudinal holes for removably connecting an upper end frame to the bearing housing. The bearing housing is thus coaxially aligned on the arbor and the alignment fixture. The upper end frame is placed over the arbor and has a corresponding longitudinal hole which fits the end frame to the pin that extends through the bearing housing from the alignment fixture. A stator unit-main frame sub-assembly is then placed over the arbor, and is aligned by reference to the arbor with the main frame loosely fitting with a tenon fitting around the outside periphery of the upper end frame to fix the stator unit-main frame sub-assembly in coaxial alignment with the rotor bore through the upper bearing housing. The loose fit of the main frame in the tenon fitting compensates for any eccentricity in the stator unit main frame sub-assembly.

A lower end frame and lower bearing housing is also placed over the arbor and clamped in place, with a similar tenon fitting in the lower end frame receiving the lower end of the main frame.

In assembling a preferred form of the machine, a tubular liner is disposed coaxially about the inner diameter of the stator unit and over the arbor to seal the winding cavity which is filled with a plastic encapsulant material.

With the stator and lower end frame fixed, the alignment fixture, the upper bearing housing and the arbor and clamping device are removed and the other usual machine parts are assembled to generally complete the machine.

By this convenient and reliable method of assembly, the invention thus assures precise axial alignment of the stator assembly, and bearing housings with the rotor bore, while permitting practical tolerances in machined parts of the assembly. This is accomplished without major redesign or addition of parts to the usual machine design.

The drawings illustrate the best mode presently contemplated by the inventor for carrying out the practice of the invention.

In the drawings:

FIG. 1 is a side elevation of an electric motor of the invention with parts in section; and FIG. 2 is a partially exploded side elevation of a sub-assembly of the motor in FIG. 1 with an alignment fixture and arbor in place and parts being in section.

DESCRIPTION

Illustrated in the drawings and particularly in FIG. 1 is a submersible electric motor 1 having a conventional squirrel cage rotor 2 carried on a rotor shaft 3. Shaft 3 is journalled for rotation at opposite ends within an upper sleeve bearing housing 4 and a lower sleeve bearing housing 5.

Rotor 2 is rotatably supported by the bearings within the rotor bore of an annular stator assembly 6. A tubular liner 7 is secured within the stator assembly 6 and seals the rotor bore from the stator.

Stator 6 includes a conventional, laminated annular magnetic core 8 and field windings 9 inserted through longitudinal slots in the core. In accordance with the invention, stator assembly 6 is secured to a generally tubular main frame 10 to form a stator unit-main frame subassembly. Main frame 10 is attached as by a suitable epoxy to the outer surface of core 8 and therefore provides a direct heat conductive path to the exterior for heat passage from the windings and core. An upper end frame 11 and a lower end frame 12, the latter of which may be integrally formed with lower bearing housing 5, are included in the motor and are annular members with central bores coaxially aligned with rotor shaft 3 which extends through the central bores. The end frames 11 and 12 each have an annular tenon fitting 13, which may be a groove, on their inner peripheries corresponding generally to the position of main frame 10. The opposite ends of main frame 10 fit loosely into tenon fittings 13 where they are positioned and held by a suitable hardened epoxy or resin 14. The depth of epoxy 14 and the position of the ends of main frame 10 in tenon fittings 13 may be varied to provide precise coaxial alignment of the stator unit-main frame subassembly with the rotor bore and shaft 3.

At the upper end of motor 1, upper end frame 11 is connected to upper bearing housing 4 by means of a number of screws 15 threaded into aligned longitudinal holes 16 and 17, extending respectively through an outer rim of bearing housing 4 and end frame 11. The fit between upper bearing housing 4 and the abutting edges of end frame 11 is not necessarily precise, and the rotor chamber is sealed from the outside by means of an O-ring seal 18 between the end frame and the base of the outer rim of bearing housing 4.

Both end frames 11 and 12 have inwardly projecting annular flanges 19 which extend in coaxial alignment with the rotor bore to the opposite ends of rotor 2. Tubular liner 7 extends beyond both ends of core 8 to fit generally loosely within a recess 20 and on the end inner surface of each flange 19. There, the liner 7 is fixed by means of a suitable adhesive in precise coaxial alignment with the rotor bore, notwithstanding any slight misalignment of the end frames. Rigidity of the stator assembly, end frames, main frame and liner assembly is provided by a plastic encapsulant material 21, which fills the winding cavity defined by these parts. As well, the stator assembly is protected from moisture by the encapsulant. Material 21 is a hardened plastic and preferably a thermosetting resin which has good heat conductivity. Polyester and epoxy resins are suitable for this use.

Other, usual parts of motor 1 include thrust components 22 disposed on shaft 3 in the rotor chamber between lower bearing housing 5 and the lower end of squirrel cage rotor 2. Attached across the central bore of lower bearing housing 5 and lower end frame 12 is a diaphragm 23 which operates in a chamber defined by a lower end cover 24. Screws 25 are threaded through cover 24 into corresponding bores in lower end frame 5 to secure cover 24 in place.

At the upper end, the motor chamber is sealed around shaft 3 by an annular seal 26 and protector assembly 27 which fits into a corresponding annulus in upper bearing housing 4. The motor windings are connected to power by a series of leads 28, only one of which is shown, that extend through lead wells 29 in upper end frame 4 and through encapsulant material 21 to their usual connections, not shown. To prevent moisture seepage into the motor, wells 29 are filled with a suitable sealing material.

A conventional check valve 30 giving access through bearing housing 4 to the rotor chamber is closed by a removable breather plug 31. Temporary access to the winding cavity may also be needed, for purposes of adding the encapsulant. Thus, an access opening 32 is provided in main frame 10 and is closed by the plastic encapsulant.

To assemble motor 1, stator assembly 6 is confined within the generally concentric members comprising of main frame 10 and liner 7 to provide a stator unit-main frame subassembly. This subassembly is positioned relative to the bearing housings and end frames in accordance with the method of the invention as described below.

Referring to FIG. 2, the stator unit-main frame subassembly is shown in position on an arbor 33 which has a cylinder 34 shaped to the precise diameter of the desired rotor bore. Arbor 33 includes a central shaft 35 which corresponds precisely to the position and diameter of rotor shaft 3. Shaft 35 supports upper bearing housing 4 and an end alignment fixture 36 on its upper end, which the fixture extending radially of shaft 35 in precise coaxial alignment. Fixture 36 serves as an alignment guide for upper end frame 11, and for that purpose has one or more guide pins 37 that fit into the longitudinally aligned holes 16 and 17.

As shown in FIG. 2 at the opposite or lower end of the stator unit-main frame subassembly, there is located the lower end frame 12 with lower bearing housing 5 ready for assembly on arbor shaft 35 which extends coaxially of the rotor bore in the lower end. As detailed later, a clamping nut 38 is shown poised for assembly against frame 12 and onto the threaded lower end of shaft 35.

An example of a method of assembly n accordance with the invention and employing arbor 33 is to fit upper bearing housing 4 to alignment fixture 36 by positioning guide pins 37 into holes 16. This is preferrably a loose fit so as not to establish the precise coaxial alignment by means of the pins 37. The shaft 35 of arbor 33 is then inserted through the central bore of bearing housing 4 and corresponding bore of fixture 36. The fixture may be secured by suitable means such as a nut 39 threaded on the upper end of shaft 35 to tighten the fixture, bearing housing and arbor together.

With the bearing housing 4 in place at the upper end of the arbor, upper end frame 11 is slipped over arbor 33 from the lower or opposite end and fitted against fixture 36 with pins 37 being inserted into longitudinal holes 17. Then, the stator unit-main frame subassembly, including liner 7, is assembled over arbor 33 from the lower end, fitting the upper end of main frame 10 into tenon fitting 13 of the end frame, and fitting the upper end of liner 7 into recess 20 of the upper end frame. Both fits are generally loose, permitting the subassembly to be aligned coaxially with the rotor bore solely by reference to the outer diameter of arbor 34. Adhesive is applied in the upper tenon fitting 13 and recess 20 to fix this aligned position of the subassembly and upper end frame.

It is convenient at this time to also assemble the leads 28 through their wells 29 and connect them to the windings.

Lower end frame 12 may now be assembled on the other end of shaft 35, lower bearing housing 5 being, in this embodiment, integral with end frame 12, so that the sleeve bearing bore is coaxially aligned on shaft 35. Similarly with the upper end, lower tenon fitting 13 and recess 20 loosely receive the lower ends of main frame 10 and liner 7 and adhesive is applied at both joints while the stator unit-main frame subassembly remains coaxially aligned on arbor 34. The assembly on arbor 34 is secured by threading clamping nut 38 on the lower end of shaft 35 until it is positioned firmly against lower end frame 12.

Lead wells 29 may be filled with the sealant material at this time and the entire assembly is cured on the arbor to harden the adhesive and filler and fix the positions of the parts. Depending on the adhesives and filler, the curing may be accomplished at room temperature or in a heated oven, not shown.

After the first curing, plastic encapsulant material 21 is injected in liquid form through access openings 32 to fill the winding cavities in the stator unit-main frame subassembly. This may be done with any suitable means such as a pump feed system from a storage tank, not shown. Openings 32 are closed by the encapsulant and the assembly is again cured. In this example, the material 21 is a thermosetting resin and the assembly is cured in a heated oven, not shown, to harden the plastic. When cured, the stator assembly 6, main frame 10, end frames 11 and 12 and liner 7 are all rigidly bonded in place by the encapsulant material 21, while core 8 and windings 9 are encapsulated and protected from moisture.

The cured assembly is then readied for assembly of the other parts of the motor. This is done by removing clamping nut 38, removing nut 39 and end alignment fixture 36, removing upper bearing housing 4, and slipping the arbor 34 and shaft 35 unit out of the rotor bore. Now, rotor 2, shaft 3 and thrust components 22 are inserted into the rotor bore, with shaft 3 extending through the bore of lower bearing housing 5 and being locked in place in the conventional fashion. Diaphragm 23 and lower end cover 24 are then assembled to lower end frame 12.

The upper bearing housing 4 is now placed over the upper end of shaft 3 for reassembly, O-ring seal 18 being placed around the base of the outer rim of the housing to be wedged against the abutting surface of upper end frame 11 as the housing is positioned. Bearing housing 4 is fastened by screws which are placed through longitudinal holes 16 and threaded into longitudinal holes 17, which previously were fitted to pins 37 of fixture 36.

Finally, seal 26 and protector assembly 27 is assembled over the outer end of shaft 3 and breather plug 31 is placed in the bore of valve 30 to generally complete the assembly of motor 1.

By the use of arbor 33 and end fixture 36, the stator unit-main frame subassembly is conveniently and accurately aligned on the arbor and fixed in that position by adhesive at the tenon fittings 13. Since the tenon fittings permit play in connecting main frame 10 to the end frames 11 and 12, the subassembly is aligned with reference to the arbor and precise machining of parts is avoided.

Various modes of carrying out the invention are contemplated as being within the scope of the following claims which particularly point out and distinctly claim the subject matter which is regarded as the invention.

I claim:

1. In a method of assembling a dynamoelectric machine having a stator unit, a main frame secured to the stator unit, and an upper end frame and a lower end frame secured to opposite ends of the main frame, the stator unit and end frames defining a central generally cylindrical rotor bore; the steps comprising:

inserting a cylindrical alignment arbor corresponding in dimension to the rotor bore through a bore of an end alignment fixture;

fitting the upper end frame over the arbor and onto the end alignment fixture in coaxial alignment with the rotor bore;

assembling the stator unit and main frame over the cylindrical alignment arbor;

aligning the stator unit with reference to the arbor while loosely fitting the main frame to the upper end frame, and securing the main frame to the upper end frame in the position required by the stator unit reference to the arbor;

assembling the lower end frame on the arbor after securing the upper end frame, and securing the main frame to the lower end frame in the position required by the stator unit reference to the arbor; and removing the arbor and alignment fixture, thereby leaving a subassembly of the dynamoelectric machine which is precisely coaxially aligned with the rotor bore.

2. In a method of assembling a dynamoelectric machine having a stator unit, a main frame secured to the stator unit, and an upper end frame and a lower end frame secured to opposite ends of the main frame and having tenon fittings corresponding generally to the opposite ends of the main frame, the stator unit and end frames defining a central generally cylindrical rotor bore; the steps comprising:

fitting the upper end frame on an end alignment fixture in coaxial alignment with the rotor bore;

assembling the stator unit and main frame over a cylindrical alignment arbor which is coaxially aligned with the end alignment fixture and corresponds in dimension to the rotor bore;

aligning the stator unit with reference to the arbor while loosely fitting the main frame into the tenon fitting of the upper end frame, and securing the main frame to the upper end frame in the position required by the stator unit reference to the arbor by applying adhesive in the tenon fitting:

assembling the lower end frame on the arbor followed by securing the main frame to the lower end frame in the same manner as secured to the upper end frame; and removing the arbor and alignment fixture, thereby leaving a subassembly of the dynamoelectric machine which is precisely coaxially aligned with the rotor bore.

3. In a method of assembling a dynamoelectric machine having a stator unit, a main frame secured to the stator unit, an upper end frame and a lower end frame secured to opposite ends of the main frame and a removable bearing housing in coaxial alignment with the rotor bore which is fixed to the upper end frame by at least one screw fitting through aligned longitudinal holes in the bearing housing and the upper end frame, the stator unit and end frames defining a central generally cylindrical rotor bore; the steps comprising:

fitting the upper end frame on an end alignment fixture by fitting one of said longitudinal holes to a pin provided by the end alignment fixture for coaxial alignment with the rotor bore;

assembling the stator unit and main frame over a cylindrical alignment arbor which is coaxially aligned with the end alignment fixture and corresponds in dimension to the rotor bore;

aligning the stator unit with reference to the arbor while loosely fitting the main frame to the upper end frame, and securing the main frame to the upper end frame in the position required by the stator unit reference to the arbor;

assembling the lower end frame on the arbor with the main frame secured to the lower end frame in the same manner as secured to the upper end frame; and removing the arbor and alignment fixture, thereby leaving a subassembly of the dynamoelectric machine which is precisely coaxially aligned with the rotor bore.

4. In a method of assembling a dynamoelectric machine having a stator unit, a main frame secured to the stator unit, and an upper end frame and a lower end frame secured to opposite ends of the main frame, the stator unit and end frames defining a central generally cylindrical rotor bore; the steps comprising:

fitting the upper end frame on an end alignment fixture in coaxial alignment with the rotor bore;

assembling the stator unit and main frame over a cylindrical alignment arbor which is coaxially aligned with the end alignment fixture and corresponds in dimension to the rotor bore;

fitting a tubular liner over the alignment arbor and within the stator unit;

aligning the stator unit with reference to the arbor while loosely fitting the main frame to the upper end frame, and securing the main frame to the upper end frame in the position required by the stator unit reference to the arbor;

loosely fitting and securing one end of the liner to the upper end frame while maintaining the liner in align-ment with the rotor bore by reference to the arbor;

assembling the lower end frame on the arbor followed by securing the main frame to the lower end frame in the same manner as secured to the upper end frame;

loosely fitting and securing the lower end frame to the other end of the liner while the lower end frame is being assembled to the main frame;

injecting a hardenable encapsulant plastic into and filling a space defined by the liner, the stator unit, the main frame and the end frames; and removing the arbor and alignment fixture, thereby leaving a subassembly of the dynamoelectric machine which is precisely coaxially aligned with the rotor bore.

5. The method of claim 4 wherein the stator unit, main frame and tubular liner are preassembled in a stator unit-main frame subassembly, and wherein the subassembly is assembled over the arbor with the one end of the main frame loosely fitting into a tenon fitting of the upper end frame and the tubular liner loosely fitting the upper end frame; and the lower end frame is similarly fitted to the opposite ends of the main frame and tubular liner.

6. A method of assembling a submersible electric motor having a plastic encapsulant stator-unit with a tubular core, an annular main frame secured to the outside diameter of the core, an upper end frame and a lower end frame on opposite ends of the stator unit, a tubular liner on the inside surface of the core, and bearing housings on opposite ends of the stator unit, the upper bearing housing being removable and attached to the upper end frame by a screw through a corresponding longitudinal hole, and the bearing housings, liner and end frames defining a rotor bore; the steps comprising:

assembling the stator unit, the tubular liner and the main frame into a subassembly;

assembling the upper bearing housing on an end fixture having an inwardly projecting pin which is received by said longitudinal hole in the bearing housing, the end fixture having a central bore coaxially aligned with the rotor bore of the upper bearing housing;

inserting one end of an arbor through the upper bearing housing bore and end fixture central bore, the arbor being a cylindrical member having the shape of the rotor bore;

placing the upper end frame over the arbor and fitting the longitudinal hole of the end frame to the pin of the end alignment fixture;

assembling said subassembly over the arbor and aligning the subassembly on the arbor, while loosely fitting one end of the main frame into a tenon fitting of the upper end frame and loosely fitting one end of the liner to an inwardly projecting flange of the upper end frame;

applying adhesive between the main frame and tenon fitting and the liner and flange;

placing the lower end frame on the opposite end of the arbor and fitting the lower end frame to the main frame and liner followed by securing the lower end frame to the main frame and liner similarly to the upper end frame;

assembling a clamping device on the arbor outside of the lower end frame and holding the assembled parts together on the arbor and end fixture and curing the adhesive;

injecting a hardenable plastic into the spaces between said subassembly and end frames to encapsulate the stator unit and bond said subassembly to the end frames and curing the plastic;

removing the clamping device, the arbor and the upper bearing housing;

assembling motor parts in the rotor bore; and replacing the bearing housing, whereby a submersible motor is manufactured with a precisely aligned rotor bore.

7. In a method of assembling a dynamoelectric machine having a stator unit, a main frame secured to the stator unit, and an upper end frame having a tenon fitting and secured to one end of the main frame, the stator unit and end frame defining a central generally cylindrical rotor bore; the steps comprising:

inserting a cylindrical alignment arbor corresponding in dimension to the rotor bore through a bore of an end alignment fixture;

fitting the upper end frame over the arbor and onto the end alignment fixture in coaxial alignment with the rotor bore;

assembling the stator unit and main frame over the cylindrical alignment arbor;

aligning the stator unit with reference to the arbor while loosely fitting the main frame into the tenon fitting of the upper end frame, and securing the main frame to the upper end frame in the position required by the stator unit reference to the arbor by applying adhesive in the tenon fitting; and removing the arbor and alignment fixture, thereby leaving a subassembly of the dynamoelectric machine which is precisely coaxially aligned with the rotor bore.

8. In the method of claim 7, and including the steps of enclosing the end of said stator unit main frame opposite to said upper end frame; and injecting a hardenable encapsulant plastic into and filling the spaces between the alignment arbor, the stator unit, the main frame, the upper end frame, and the enclosure to the main frame end opposite to the upper end frame.

* * * * *